(12) United States Patent
Wu

(10) Patent No.: US 6,937,299 B2
(45) Date of Patent: Aug. 30, 2005

(54) VEHICLE LCD WITH AN ILLUMINATED CONTROL PANEL

(76) Inventor: Tai-Hsiung Wu, 6F-1, No. 375, Sec. 1, Chuangching Rd., Taoyuan (TW)

( * ) Notice: Subject to any disclaimer, the term of this patent is extended or adjusted under 35 U.S.C. 154(b) by 98 days.

(21) Appl. No.: 10/704,428

(22) Filed: Nov. 7, 2003

(65) Prior Publication Data

US 2005/0099553 A1 May 12, 2005

(51) Int. Cl.[7] ..................... G02F 1/1335; G02F 1/1333
(52) U.S. Cl. ............................. 349/58; 349/11; 349/61; 345/87; 345/905; 361/681; 361/714; 361/752
(58) Field of Search ............................. 349/58, 11, 61; 345/87, 905; 361/681, 714, 752; 385/146

(56) References Cited

U.S. PATENT DOCUMENTS 5,696,529 A * 12/1997 Evanicky et al. ........... 345/659
6,406,160 B1 * 6/2002 Itoh ............................ 362/31
6,591,530 B1 * 7/2003 Liao ............................ 40/714

* cited by examiner

*Primary Examiner*—Huyen Ngo
(74) *Attorney, Agent, or Firm*—William E. Pelton, Esq.

(57) ABSTRACT

A vehicle LCD includes an LCD screen installed in a housing. A transparent bar is mounted between the housing and the LCD screen and along sides of the LCD screen. A channel is defined in the transparent bar and along the sides of the LCD screen. A cold-light strip is received in the channel. A plurality of buttons is mounted on a control panel of the housing. Whereby, the buttons can be illuminated by the cold-light strip, so the user can directly press the buttons at night or in a dark environment without having to turn on an interior lamp in a vehicle.

5 Claims, 3 Drawing Sheets

VEHICLE LCD WITH AN ILLUMINATED CONTROL PANEL

BACKGROUND OF THE INVENTION

1. Field of the Invention

The present invention relates to an LCD, and more particularly to a vehicle LCD of which buttons on a panel can be seen even in a dark environment.

2. Description of Related Art

Nowadays, many vehicles such as buses or cars have been provided with an LCD for playing VCD or DVD movies. However, a control panel of the conventional LCD is not illuminated and buttons on the control panel will not be visible in a night or a dark environment, so a user will fumble to press the buttons or have to turn on an interior lamp in the vehicle, which is a very inconvenient way to operate the LCD, as well as being dangerous.

Therefore, the invention provides a vehicle LCD with an illuminated control panel to mitigate or obviate the aforementioned problems.

SUMMARY OF THE INVENTION

The main objective of the present invention is to provide a vehicle LCD of which buttons on a control panel can be seen in a dark environment.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
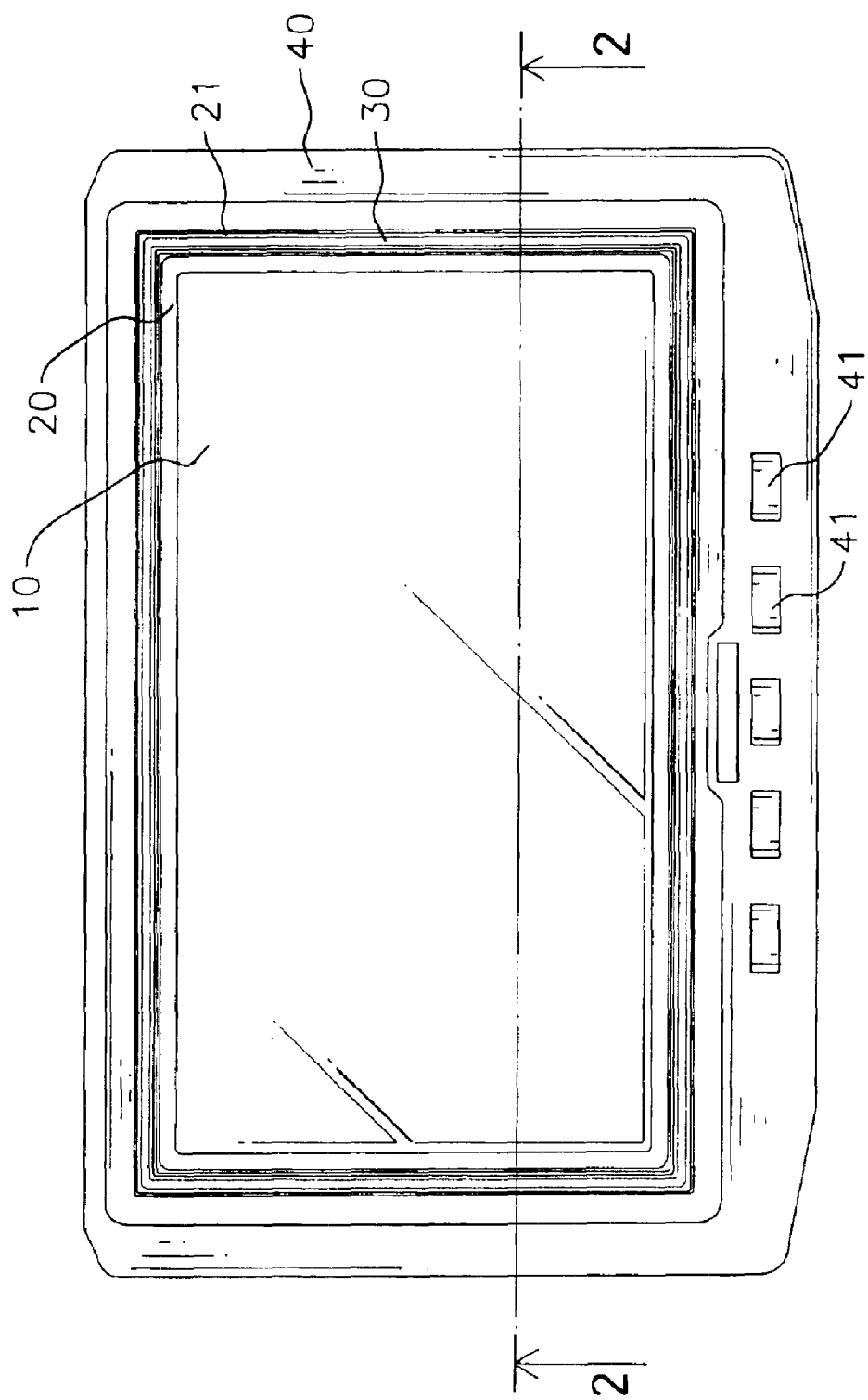
FIG. 1 is a front plan view of a vehicle LCD in accordance with the invention.
Figure 2:
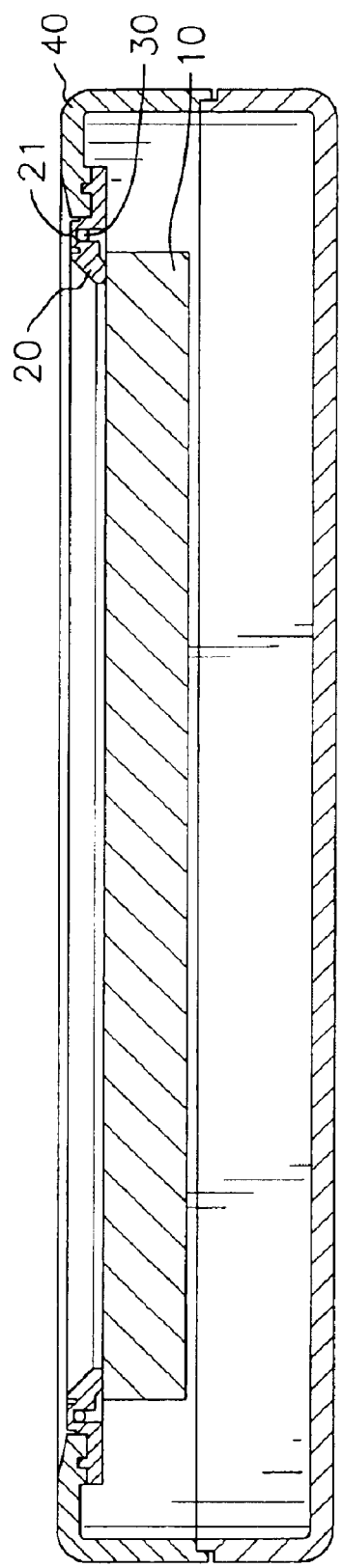
FIG. 2 is a cross sectional view of the vehicle LCD.
Figure 3:
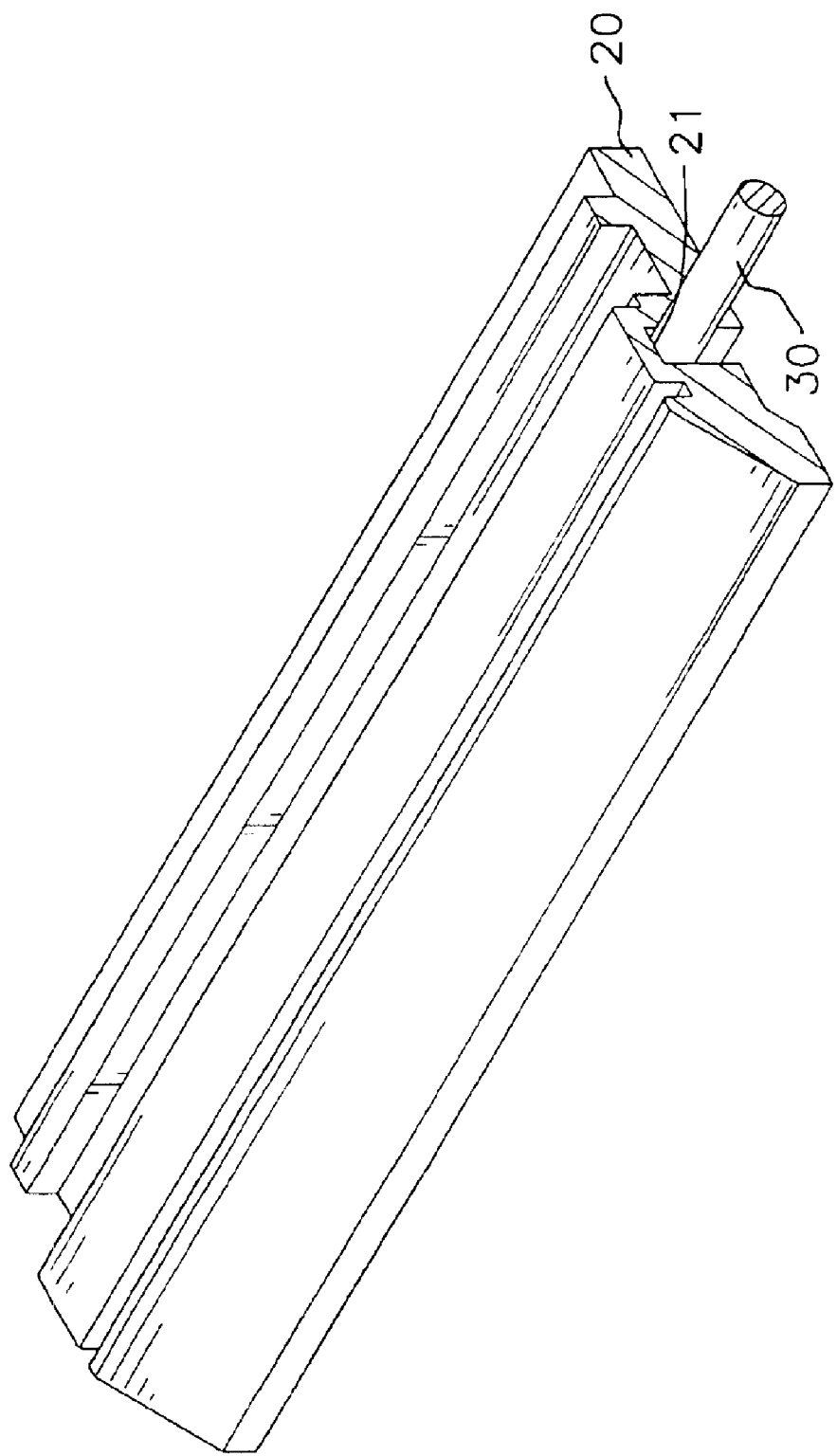
FIG. 3 is a partially perspective view of the vehicle LCD.

With reference to FIGS. 1–3, a vehicle LCD in accordance with the invention has an LCD screen (10) installed in a housing (40). A transparent bar (20) is mounted between the housing (40) and the LCD screen (10) and along sides of the LCD screen (10), and has a channel (21) is defined therein along the sides of the LCD screen (10). The transparent bar (20) can be made of transparent acryl or plastic material.

A cold-light strip (30) with a circular cross section is received in the channel (21). The cold-light strip (30) can be tinted with one or more of a group of various color tints to provide a choice for a user. A plurality of buttons (41) is mounted on a control panel (not numbered) of the housing (40) and under the LCD screen (10).

The vehicle LCD can be installed on a proper position in a bus or a car. The buttons (41) under the LCD screen (10) are illuminated by the cold-light strip (30), so the user can see and press the buttons (41) even in a dark environment. The user also can select the cold-light strip (30) with a desired color tint (such as blue or white) to provide an attractive appearance for the panel.

Therefore, according to the present invention, the buttons (41) can be illuminated by the cold-light strip (30), so the user can directly press the buttons (41) at night or in a dark environment without having to turn on an interior lamp in the vehicle.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vehicle LCD with an illuminated control panel comprising:

an LCD screen installed in a housing;

a transparent bar mounted between the housing and the LCD screen and along sides of the LCD screen, and having a channel defined in the transparent bar and along the sides of the LCD screen;

a cold-light strip received in the channel; and a plurality of buttons mounted on a control panel of the housing.

2. The vehicle LCD as claimed in claim 1, wherein the transparent bar is made of transparent acryl material.

3. The vehicle LCD as claimed in claim 1, wherein the transparent bar is made of transparent plastic material.

4. The vehicle LCD as claimed in claim 1, wherein the cold-light strip has a circular cross section.

5. The vehicle LCD as claimed in claim 1, wherein tinting of the cold-light strip is selectable from a group of different color tints.

\* \* \* \* \*